United States Patent
Koide

(10) Patent No.: US 8,102,847 B2
(45) Date of Patent: Jan. 24, 2012

(54) FRAME PROCESSING METHOD AND FRAME PROCESSING APPARATUS

(75) Inventor: Toshio Koide, Tokyo (JP)

(73) Assignee: NEC Corporation, Tokyo (JP)

( * ) Notice: Subject to any disclaimer, the term of this patent is extended or adjusted under 35 U.S.C. 154(b) by 595 days.

(21) Appl. No.: 12/096,702

(22) PCT Filed: Dec. 7, 2006

(86) PCT No.: PCT/JP2006/324885
§ 371 (c)(1),
(2), (4) Date: Jun. 9, 2008

(87) PCT Pub. No.: WO2007/066814
PCT Pub. Date: Jun. 14, 2007

(65) Prior Publication Data
US 2009/0245251 A1 Oct. 1, 2009

(30) Foreign Application Priority Data
Dec. 9, 2005 (JP) .................. 2005-355610

(51) Int. Cl.
*H04L 12/56* (2006.01)
*H04L 12/54* (2006.01)
(52) U.S. Cl. ............. 370/390; 370/401; 370/428
(58) Field of Classification Search ........... 370/390, 370/401, 428
See application file for complete search history.

(56) References Cited

U.S. PATENT DOCUMENTS

| | | | |
|---|---|---|---|
| 7,587,591 B2* | 9/2009 | Lebovitz et al. | 713/163 |
| 7,849,217 B2* | 12/2010 | Meier | 709/245 |
| 7,911,946 B2* | 3/2011 | Poli et al. | 370/230 |
| 2001/0012296 A1* | 8/2001 | Burgess et al. | 370/392 |
| 2004/0158872 A1* | 8/2004 | Kobayashi | 725/120 |
| 2006/0171407 A1* | 8/2006 | Kim et al. | 370/432 |
| 2006/0274751 A1* | 12/2006 | Tsuchiya et al. | 370/390 |
| 2007/0110248 A1* | 5/2007 | Li | 380/278 |
| 2009/0147718 A1* | 6/2009 | Liu et al. | 370/312 |

FOREIGN PATENT DOCUMENTS

| | | |
|---|---|---|
| JP | 2001-24683 | 1/2001 |
| JP | 2003-298602 | 10/2003 |
| JP | 2004-312564 | 11/2004 |
| JP | 2004-363897 | 12/2004 |

* cited by examiner

*Primary Examiner* — Dang Ton
*Assistant Examiner* — Ryan Kavleski
(74) *Attorney, Agent, or Firm* — Scully, Scott, Murphy & Presser, P.C.

(57) ABSTRACT

When a data link layer frame whose destination address has been designated as a multiple address is inputted from a tunneling source via a decapsulation unit 202, a destination processing unit 201 generates data link layer frames in which the destination address of the frame is replaced with each of one or more unicast addresses that are preset in a table unit 205 for a source address of the data link layer frame and outputs the generated frames to a local network 11.

21 Claims, 5 Drawing Sheets

FRAME PROCESSING METHOD AND FRAME PROCESSING APPARATUS

TECHNICAL FIELD

The present invention relates to a frame processing method and a frame processing apparatus, and more particularly to a frame processing method and a frame processing apparatus which can achieve conversion of a broadcast frame or a multicast frame into unicast frames and transmission only to a preauthorized terminal.

BACKGROUND ART

In recent years, there have increased cases in which home information appliance devices (hereinafter referred to as terminals), such as game consoles and AV equipment, are added to PCs in a home so as to form a home LAN (Local Area Network, hereinafter referred to as LAN). Furthermore, there have been provided various services for performing remote control by connecting away from home to those terminals via a transit network such as the Internet, for sharing information such as pictures or movies with each other via connection between homes, or for enjoying real-time games.

In those services, to prevent leakage of information and unauthorized access, it is important to ensure only communication between preauthorized terminals. In order to ensure only communication between preauthorized terminals, as shown in FIG. 2, it is necessary to provide tunneling parts 41 and 42 in respective terminals for configuring a communication tunnel and to connect between the end terminals via the communication tunnel. Assuming general home LAN environments, terminals 30 and 31 themselves cannot be provided with a tunneling part or the like to configure a communication tunnel for interconnection with another terminal 36. Furthermore, virtualization technology for LAN, such as VLAN, cannot be used in general environments. Therefore, as shown in FIG. 1, there is used in most cases a method in which a dedicated device other than terminals uses a tunneling means or the like for interconnection of the entire LAN.

In FIG. 1, a terminal 30 and a terminal 31 are connected to a LAN 11, which is connected to a transit network 10 such as the Internet via a frame processing apparatus 20. The frame processing apparatus 20 has a tunneling part 41 for configuring a communication tunnel. A terminal 36 has a tunneling part 42. A communication tunnel is configured in the transit network 10 between the tunneling part 41 and the tunneling part 42. Thus, the terminal 36, which is connected to the transit network 10, can access each of the terminals 30 and 31 in the LAN 11 via the communication tunnel.

With the above arrangement, external terminals accessible to the terminals 30 and 31 connected to the LAN 11 can be limited to the terminal 36 in which the communication tunnel has been configured via the frame processing apparatus 20. Unlike the case shown in FIG. 2, however, the terminals connected to the LAN 11 cannot be grouped such that communication is allowed between the terminal 36 and the terminal 30 but not between the terminal 36 and the terminal 31. This is because, in a case where a destination address of an Ethernet frame transmitted from the terminal 36 is designated as a broadcast address or a multicast address, in order to deliver the frame to the terminal 30, the frame processing apparatus 20 needs to send the frame to the LAN 11, so that the frame is inevitably received by the terminal 31 other than the authorized terminal 30.

Technology of transmitting data only to authorized terminals is disclosed in Japanese laid-open patent publication No. 2004-312564 (Reference 1) and Japanese laid-open patent publication No. 2004-363897 (Reference 2). This technology is to convert an IP packet transmitted with IP multicast into unicast IP packet and transmit the converted packet. This technology is applied to the frame processing apparatus 20. The destination multicast address of the IP packet is converted to the unicast address of the terminal 30, and the converted packet is then sent. This method is effective only to IP multicast packets. However, few home information appliances are based on the use of IP multicast. Therefore, the fields of application are limited. Rather, in home information appliances based on the use of IP multicast, because an IP packet that would be delivered with a multicast address is delivered with a unicast address, address-converted packets may be unable to be processed.

Furthermore, other prior art technology of transmitting data only to authorized terminals is disclosed in Japanese laid-open patent publication No. 2003-298602 (Reference 3). In the other prior art technology, a table holds correlation between multicast MAC addresses and unicast MAC addresses. If a received MAC frame is a multicast frame, then retrieval from the table is performed with using the multicast MAC address as a key, the received MAC frame is converted into a MAC frame having the corresponding unicast address, and the converted MAC frame is transmitted. This technology is applied to the frame processing apparatus 20. The destination multicast address of the MAC frame is converted into the unicast address of the terminal 30, and the converted MAC frame is then sent. However, because a unicast MAC address is uniquely identified by a multicast MAC address, if a plurality of external terminals 36 are connected to the frame processing apparatus 20 via the transit network 10, multicast frames sent from all of the external terminals are equally converted into unicast frames. Therefore, specific terminals cannot be grouped such that only a multicast MAC address from a specific external terminal is transmitted to a specific terminal 30 with unicast.

DISCLOSURE OF INVENTION

Problems to be Solved by the Invention

As described above, there is a problem that, when a destination address of an Ethernet frame transmitted from a remote terminal has been designated as a broadcast address or a multicast address, the Ethernet frame is received and processed by a terminal other than preauthorized terminals.

An object of the present invention is to provide a frame processing method and a frame processing apparatus which allow only a preauthorized terminal to receive and process a frame without use of virtualization technology for LAN, such as VLAN, and without any special processing in the terminal even if a destination address of an Ethernet frame has been designated as a broadcast address or a multicast address.

Means for Solving the Problems

A frame processing method according to a first aspect of the present invention includes a step of converting a data link layer frame obtained from a first network and having a destination address designated as a multiple address into one or more data link layer frames in which the destination address is replaced with each of one or more unicast addresses that are associated in advance with a source address of the data link layer frame; and outputting the converted data link layer frames to a second network.

The frame processing method includes a step of receiving an encapsulated network layer packet from the first network and decapsulating the received network layer packet to obtain the data link layer frame.

The frame processing method includes a step of directly outputting a data link layer frame whose destination address has been designated as other than a multiple address to the second network.

The frame processing method includes a step of, if a set of a destination address and a source address of a data link layer frame received from the second network is matched with a predetermined set of a destination address and a source address, or if the destination address of the data link layer frame has been designated as a multiple address and the source address of the data link layer frame is matched with one or more predetermined source addresses, then validating the data link layer frame, otherwise discarding the data link layer frame; and a step of, if the destination address of the valid data link layer frame has been designated as a multiple address, encapsulating the data link layer frame into at least one network layer packet whose destination address is set to be at lease one tunneling destination address predetermined for the source address of the data link layer frame, or, if the destination address of the valid data link layer frame has not been designated as a multiple address, encapsulating the data link layer frame into a network layer packet whose destination address is set to be a tunneling destination address predetermined for the set of the destination address and the source address of the data link layer frame, and transmitting each packet to the first network.

In a frame processing apparatus connected to a first network and a second network and having a table unit holding at least one set of a local address which is a data link layer address of a terminal connected to the second network, a remote address which is a data link layer address of a terminal connected to a local network under the control of a tunneling destination apparatus, and a tunneling destination address which is a network layer address assigned to the tunneling destination apparatus on the first network, a frame processing method according to a second aspect of the present invention includes:

a) a step of receiving an encapsulated network layer packet from the first network and decapsulating the received network layer packet to obtain a data link layer frame;

b) a step of, if a destination address of the data link layer frame obtained in step a) has been designated as a multiple address, retrieving data from the table unit with using a source address of the data link layer frame as a key for the remote address, generating one or more frames in which the destination address of the data link layer frame is replaced with each of local addresses of one or more matched sets, and transmitting the generated frames to the second network, or, if the destination address of the data link layer frame has been designated as other than a multiple address, transmitting the data link layer frame directly to the second network;

c) a step of receiving a data link layer frame from the second network, retrieving data from the table unit with using a destination address and a source address of the received data link layer frame as keys for the remote address and the local address, if there is any matched set, or if the destination address of the received data link layer frame has been designated as a multiple address and there is any matched set when retrieving data from the table unit with using the source address of the received data link layer frame as a key for the local address, then validating the data link layer frame, otherwise discarding the data link layer frame; and d) a step of, if the destination address of the data link layer frame validated in step c) has been designated as a multiple address, retrieving data from the table unit with using the source address of the data link layer frame as a key for the local address and encapsulating the data link layer frame into at least one network layer packet whose destination address is set to be each of different tunneling destination addresses of one or more matched sets, or, if the destination address of the data link layer frame validated in step c) has not been designated as a multiple address, retrieving data from the table unit with using the destination address and the source address of the data link layer frame as keys for the remote address and the local address and encapsulating the data link layer frame into a network layer packet whose destination address is set to be a tunneling destination address of the matched set, and transmitting each packet to the first network.

Here, for improvement of the efficiency, the processes of step a) and step b) may be combined so as to hold the retrieval result of the table unit with performing only one retrieval.

In the frame processing method, it is desirable that the data link layer frame be an Ethernet frame, that the network layer packet be an IP packet, that the multiple address be a broadcast address or a multicast address of an Ethernet, that each of the local address and the remote address in the table unit be a MAC address, that the tunneling destination address in the table unit be an IP address, that the first network be an intranet or the Internet capable of transferring an IP packet, and that the second network be a wired or wireless LAN capable of transferring an Ethernet frame.

In the frame processing method, it is desirable that the encapsulation method and the decapsulation method used in step d) and step a) be either one of EtherIP, Ethernet over HTTPS, Ethernet over IPsec, L2TP, Ethernet over UDP, and Ethernet over TCP.

A frame processing apparatus according to a third aspect of the present invention has a destination processing unit operable to convert a data link layer frame obtained from a first network and having a destination address designated as a multiple address into one or more data link layer frames in which the destination address of the data link layer frame is replaced with each of one or more unicast addresses that are associated in advance with a source address of the data link layer frame and to output the converted data link layer frames to a second network.

The frame processing apparatus further has a decapsulation unit operable to receive an encapsulated network layer packet from the first network and decapsulate the received network layer packet to obtain the data link layer frame.

The destination processing unit directly outputs a data link layer frame whose destination address has been designated as other than a multiple address to the second network.

The frame processing apparatus further has:

a filter unit operable to, if a set of a destination address and a source address of a data link layer frame received from the second network is matched with a predetermined set of a destination address and a source address, or if the destination address of the data link layer frame has been designated as a multiple address and the source address of the data link layer frame is matched with one or more predetermined source addresses, then validate the data link layer frame, otherwise discard the data link layer frame; and an encapsulation unit operable to, if the destination address of the valid data link layer frame has been designated as a multiple address, encapsulate the data link layer frame into at least one network layer packet whose destination address is set to be at lease one tunneling destination address predetermined for the source address of the data link layer frame, or, if the destination address of the valid data link layer frame has not been designated as a multiple address, encapsulate the data link layer frame into a network layer packet whose destination address is set to be a tunneling destination address predetermined for the set of the destination address and the source address of the data link layer frame, and transmit each packet to the first network.

A frame processing apparatus according to a fourth aspect of the present invention has:

in a frame processing apparatus connected to a first network and a second network, a table unit holding at least one set of a local address which is a data link layer address of a terminal connected to the second network, a remote address which is a data link layer address of a terminal connected to a local network under the control of a tunneling destination apparatus, and a tunneling destination address which is a network layer address assigned to the tunneling destination apparatus on the first network;

a decapsulation unit operable to receive an encapsulated network layer packet from the first network and decapsulate the received network layer packet to obtain a data link layer frame;

a destination processing unit operable to, if a destination address of the data link layer frame obtained in the decapsulation unit has been designated as a multiple address, retrieve data from the table unit with using a source address of the data link layer frame as a key for the remote address, generate one or more frames in which the destination address of the data link layer frame is replaced with each of local addresses of one or more matched sets, and transmit the generated frames to the second network, or, if the destination address of the data link layer frame has been designated as other than a multiple address, transmit the data link layer frame directly to the second network;

a filter unit operable to receive a data link layer frame from the second network, retrieve data from the table unit with using a destination address and a source address of the received data link layer frame as keys for the remote address and the local address, if there is any matched set, or if the destination address of the received data link layer frame has been designated as a multiple address and there is any matched set when retrieving data from the table unit with using the source address of the received data link layer frame as a key for the local address, then validate the data link layer frame, otherwise discard the data link layer frame; and an encapsulation unit operable to, if the destination address of the data link layer frame validated in the filter unit has been designated as a multiple address, retrieve data from the table unit with using the source address of the data link layer frame as a key for the local address and encapsulate the data link layer frame into at least one network layer packet whose destination address is set to be each of different tunneling destination addresses of one or more matched sets, or, if the destination address of the data link layer frame validated in the filter unit has not been designated as a multiple address, retrieve data from the table unit with using the destination address and the source address of the data link layer frame as keys for the remote address and the local address and encapsulate the data link layer frame into a network layer packet whose destination address is set to be a tunneling destination address of the matched set, and transmit each packet to the first network.

For improvement of the efficiency, the decapsulation means and the destination processing means may be combined into one means so as to hold the retrieval result of the table unit with performing only one retrieval.

It is desirable that the data link layer frame be an Ethernet frame, that the network layer packet be an IP packet, that the multiple address be a broadcast address or a multicast address of an Ethernet, that each of the local address and the remote address in the table unit be a MAC address, that the tunneling destination address in the table unit be an IP address, that the first network be an intranet or the Internet capable of transferring an IP packet, and that the second network be a wired or wireless LAN capable of transferring an Ethernet frame.

It is desirable that the encapsulation method and the decapsulation method used in the encapsulation unit and the decapsulation unit be either one of EtherIP, Ethernet over HTTPS, Ethernet over IPsec, L2TP, Ethernet over UDP, and Ethernet over TCP.

A program according to a fifth aspect of the present invention provides a computer with a function of destination processing means for converting a data link layer frame obtained from a first network and having a destination address designated as a multiple address into one or more data link layer frames in which the destination address is replaced with each of one or more unicast addresses that are associated in advance with a source address of the data link layer frame; and outputting the converted data link layer frames to a second network.

The program provides the computer with a further function of decapsulation means for receiving an encapsulated network layer packet from the first network and decapsulating the received network layer packet to obtain the data link layer frame.

The destination processing means directly outputs a data link layer frame whose destination address has been designated as other than a multiple address to the second network.

The program provides the computer with further functions of:

filter means for, if a set of a destination address and a source address of a data link layer frame received from the second network is matched with a predetermined set of a destination address and a source address, or if the destination address of the data link layer frame has been designated as a multiple address and the source address of the data link layer frame is matched with one or more predetermined source addresses, then validating the data link layer frame, otherwise discarding the data link layer frame; and encapsulation means for, if the destination address of the valid data link layer frame has been designated as a multiple address, encapsulating the data link layer frame into at least one network layer packet whose destination address is set to be at lease one tunneling destination address predetermined for the source address of the data link layer frame, or, if the destination address of the valid data link layer frame has not been designated as a multiple address, encapsulating the data link layer frame into a network layer packet whose destination address is set to be a tunneling destination address predetermined for the set of the destination address and the source address of the data link layer frame, and transmitting each packet to the first network.

A program according to a sixth aspect of the present invention provides.

a computer being connected to a first network and a second network and having a storage unit operable to store a table holding at least one set of a local address which is a data link layer address of a terminal connected to the second network, a remote address which is a data link layer address of a terminal connected to a local network under the control of a tunneling destination apparatus, and a tunneling destination address which is a network layer address assigned to the tunneling destination apparatus on the first network, with functions of:

decapsulation means for receiving an encapsulated network layer packet from the first network and decapsulating the received network layer packet to obtain a data link layer frame;

destination processing means for, if a destination address of the data link layer frame obtained in the decapsulation means has been designated as a multiple address, retrieving data from the table with using a source address of the data link layer frame as a key for the remote address, generating one or more frames in which the destination address of the data link layer frame is replaced with each of local addresses of one or more matched sets, and transmitting the generated frames to the second network, or, if the destination address of the data link layer frame has been designated as other than a multiple address, transmitting the data link layer frame directly to the second network;

filter means for receiving a data link layer frame from the second network, retrieving data from the table with using a destination address and a source address of the received data link layer frame as keys for the remote address and the local address, and, if there is any matched set, or if the destination address of the received data link layer frame has been designated as a multiple address and there is any matched set when retrieving data from the table with using the source address of the received data link layer frame as a key for the local address, then validating the data link layer frame, otherwise discarding the data link layer frame; and encapsulation means for, if the destination address of the data link layer frame validated in the filter means has been designated as a multiple address, retrieving data from the table with using the source address of the data link layer frame as a key for the local address and encapsulating the data link layer frame into at least one network layer packet whose destination address is set to be each of different tunneling destination addresses of one or more matched sets, or, if the destination address of the data link layer frame validated in the filter means has not been designated as a multiple address, retrieving data from the table with using the destination address and the source address of the data link layer frame as keys for the remote address and the local address and encapsulating the data link layer frame into a network layer packet whose destination address is set to be a tunneling destination address of the matched set, and transmitting each packet to the first network.

Here, for improvement of the efficiency, the decapsulation means and the destination processing means may be combined into one means so as to hold the retrieval result of the table unit with performing only one retrieval.

It is desirable that the data link layer frame be an Ethernet frame, that the network layer packet be an IP packet, that the multiple address be a broadcast address or a multicast address of an Ethernet, that each of the local address and the remote address in the table unit be a MAC address, that the tunneling destination address in the table unit be an IP address, that the first network be an intranet or the Internet capable of transferring an IP packet, and that the second network be a wired or wireless LAN capable of transferring an Ethernet frame.

It is desirable that the encapsulation method and the decapsulation method used in the encapsulation means and the decapsulation means be either one of EtherIP, Ethernet over HTTPS, Ethernet over IPsec, L2TP Ethernet over UDP, and Ethernet over TCP.

According to the present invention, with reference to a source address of a data link layer frame obtained from a first network and having a destination address designated as a multiple address, the frame is converted into unicast frames whose destination addresses are set to be addresses of one or more corresponding terminals that are predetermined to accept transmission from the source address, and transmitted to a second network.

EFFECTS OF THE INVENTION

According to the present invention, there can be provided a frame processing method and a frame processing apparatus which allow only a preauthorized terminal to receive and process a frame without use of virtualization technology for LAN, such as VLAN, and without any special processing in the terminal even if a destination address of an Ethernet frame has been designated as a broadcast address or a multicast address. This is because a data link layer frame whose destination address has been designated as a multiple address is converted into unicast frames whose destination addresses are set to be addresses of one or more corresponding terminals that are predetermined in association with a source address of the frame, and transmitted to a second network.

BEST MODE FOR CARRYING OUT THE INVENTION

Next, a first exemplary embodiment of the present invention will be described in detail with reference to the drawings.

Figure 1:
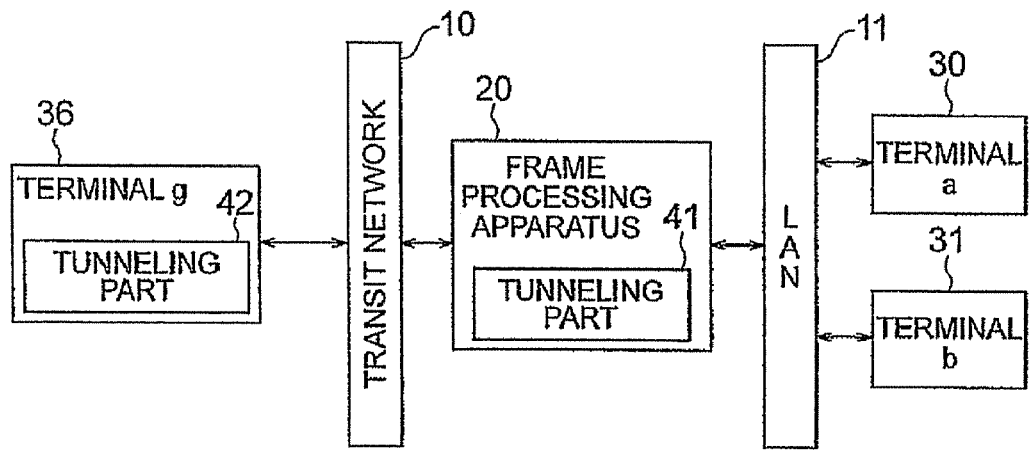
FIG. 1 is a block diagram showing a network configuration in a case where dedicated devices other than terminals employ a method of interconnecting with an entire LAN.
Figure 2:
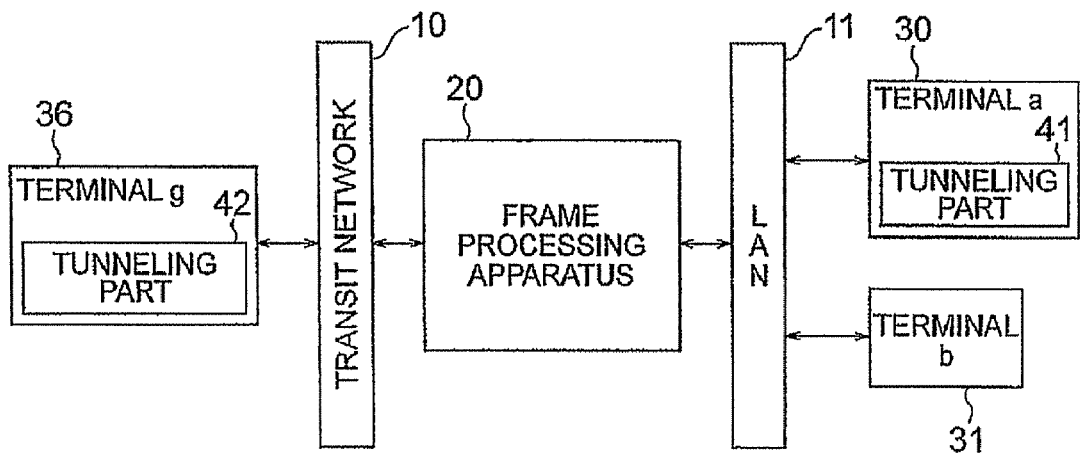
FIG. 2 is a block diagram showing a network configuration in a case where a terminal itself uses tunneling means or the like to interconnect with other terminals.
Figure 3:
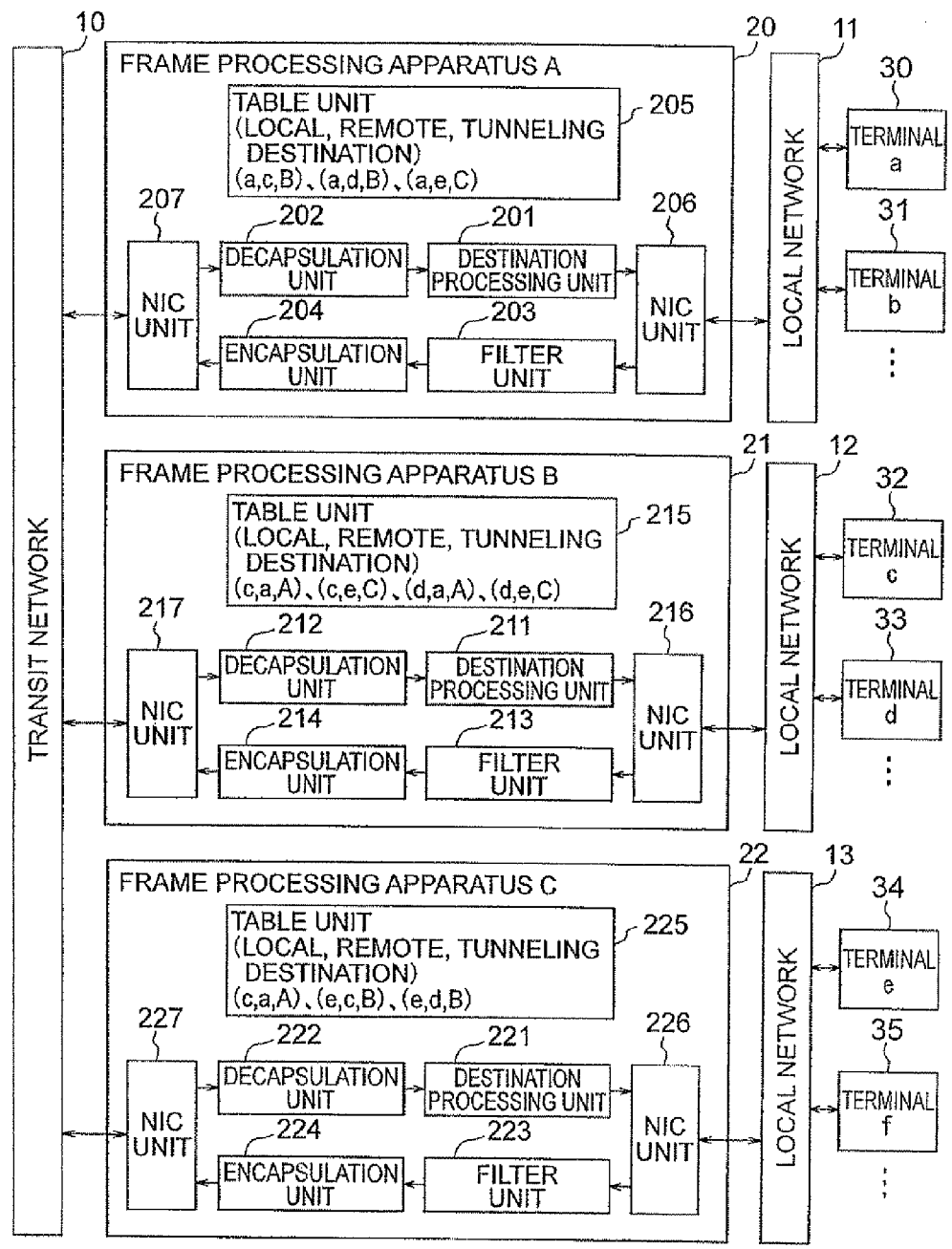
FIG. 3 is a block diagram showing an entire network configuration of a first exemplary embodiment of the present invention.

Referring to FIG. 3, the entire network includes a transit network 10 operable to communicate with using IP packets, such as the Internet or a regional IP network, a plurality of local networks 11-13 which are broadcast domains formed by the Ethernet, a wireless LAN, or the like in home, office, or the like and are operable to communicate with using Ethernet frames, a plurality of terminals 30-35 connectable to the local networks 11-13, and a plurality of frame processing apparatuses 20-22 operable to tunnel only preauthorized Ethernet frames, among Ethernet frames generated from the terminals 30-35 in the local networks 11-13, through the transit network 10 into the other local networks 11-13 and to convert, replicate, and discard the Ethernet frames as needed.

The transit network 10 sends IP packets received from a plurality of frame processing apparatuses 20-22 connected to the transit network 10, correctly to destinations designated in those IP packets. IP addresses for identifying the frame processing apparatuses 20-22 are used for the destinations.

The local networks 11-13 send Ethernet frames received from the terminals 30-35 or the frame processing apparatuses 20-22 connected to the local networks 11-13, correctly to destinations designated in the Ethernet frames. MAC addresses for identifying the terminals 30-35 and the frame processing apparatuses 20-22 are used for the destinations. The MAC addresses include unicast addresses indicative of each of the terminals 30-35 and the frame processing apparatuses 20-22, broadcast addresses indicative of all of the terminals 30-35 and the frame processing apparatuses 20-22 connected to the local networks 11-13, and multicast addresses indicative of any combination of the devices. The broadcast addresses and the multicast addresses are collectively referred to as multiple addresses.

Specifically the local network 11-13 includes a switching hub for performing efficient transfer of Ethernet frames with learning source MAC addresses, a wireless LAN access point for bridging communication between wireless and wired networks, radio waves, Ethernet cables, and the like.

Each of the terminals 30-35 has one NIC (Network Interface Card) unit (not shown) at a contact point with the local network 11-13. The NIC unit of the terminal 30-35 holds a MAC address as an identifier used in the local network 11-13 and receives Ethernet frames from and transmits Ethernet frames to the local network 11-13. Among Ethernet frames received from the local network 11-13, the NIC unit discards an Ethernet frame whose destination MAC address is designated as a unicast address that is not the MAC address of that terminal. By contrast, the source MAC address of an Ethernet frame transmitted from the NIC unit to the local network 11-13 is always the MAC address of that terminal.

Each of the frame processing apparatuses 20-22 has a destination processing unit 201, 211, or 221, a decapsulation unit 202, 212, or 222, a filter unit 203, 213, or 223, an encapsulation unit 204, 214, or 224, a table unit 205, 215, or 225, and two NIC units 206, 216, or 226, and 207, 217, or 227.

The table unit 205, 215, or 225 of the frame processing apparatus 20-22 holds one or more sets of a local address, a remote address, and a tunneling destination address in advance. The tunneling destination address refers to the IP address on the transit network which has been assigned to the frame processing apparatus 20-22 as the tunneling destination. The local address refers to the MAC address of the terminal 30-35 connected to the local network 11-13 under the control of that frame processing apparatus 20-22. The remote address refers to the MAC address of the terminal 30-35 connected to the local network 11-13 under the control of the frame processing apparatus 20-22 identified by the tunneling destination address.

When the destination address of an Ethernet frame inputted from the decapsulation unit 202, 212, or 222 is designated as a multiple address, the destination processing unit 201, 211, or 221 of the frame processing apparatus 20-22 retrieves data from the table unit 205, 215, or 225 with using the source MAC address of the Ethernet frame as a key for the remote address, generates one or more frames whose destination MAC address is replaced with each of the local addresses of one or more matched sets, and transmits the generated frames to the local network 11-13 through the NIC unit 206, 216, or 226. When the destination MAC address of an inputted Ethernet frame is designated as other than a multiple address, the destination processing unit 201, 211, or 221 transmits the Ethernet frame to the local network 11-13 through the NIC unit 206, 216, or 226.

Here, the destination processing unit 201, 211, or 221 does not change the destination IP address even if the higher layer is IP. As a result, even when the destination MAC address has been designated as a unicast address, the destination processing unit 201, 211, or 221 may generate and transmit an Ethernet frame whose destination IP address is designated as a broadcast address or a multicast address. This is for the purpose of preventing a situation in which an address-converted packet is not processed because an IP packet that should be delivered with a multicast address is delivered with a unicast address in home information appliances based on the use of IP multicast. As a matter of course, if there is no possibility of such a situation, an IP address may be converted into a unicast address.

When the filter unit 203, 213, or 223 of the frame processing apparatus 20-22 receives a data link layer frame from the local network 11-13 through the NIC unit 206, 216, or 226, it retrieves data from the table unit 205, 215, or 225 with using the destination MAC address and the source MAC address of the frame as keys for the remote address and the local address. When the destination MAC address of the frame has been designated as a multiple address, the filter unit 203, 213, or 223 retrieves data from the table unit 205, 215, or 225 with using the source MAC address as a key for the local address. If there are any matched sets in the above cases, the filter unit 203, 213, or 223 outputs the frame to the encapsulation unit 204, 214, or 224. Otherwise, the filter unit 203, 213, or 223 discards the frame.

The decapsulation unit 202, 212, or 222 of the frame processing apparatus 20-22 receives an encapsulated IP packet from the transit network 10 through the NIC unit 207, 217, or 227, then decapsulates the IP packet to restore an Ethernet frame, and outputs the frame to the destination processing unit 201, 211, or 221.

When the destination MAC address of the inputted frame has been designated as a multiple address, the encapsulation unit 204, 214, or 224 of the frame processing apparatus 20-22 retrieves data from the table unit 205, 215, or 225 with using the source MAC address of the frame as a key for the local address and encapsulates the frame into one or more IP packets whose destination IP addresses are set to be tunneling destination addresses of one or more matched sets. When the destination MAC address of the inputted frame has not been designated as a multiple address, the encapsulation unit 204, 214, or 224 retrieves data from the table unit 205, 215, or 225 with using the destination MAC address and the source MAC address as keys for the remote address and the local address and then encapsulates the frame into an IP packet whose destination IP address is set to be a tunneling destination address of the matched set. The encapsulation unit 204, 214, or 224 transmits the IP packets to the transit network 10 via the NIC unit 207, 217, or 227. If a plurality of sets including the same tunneling destination address are matched, then individual IP packets are not transmitted but one IP packet is transmitted only once. This operation prevents IP packets having the same content from being transmitted a plurality of times to the corresponding frame processing apparatus 20-22.

The encapsulation method and the decapsulation method used in the encapsulation units 204, 214, and 224 and the decapsulation units 202, 212, and 222, respectively, may be either one of EtherIP, Ethernet over HTTPS, Ethernet over IPsec, L2TP, Ethernet over UDP, and Ethernet over TCP, The encapsulation unit 204, 214, or 224 and the decapsulation unit 202, 212, or 222 form a tunneling part.

The NIC unit 206, 216, or 226 of the frame processing apparatus 20-22 is connected to the local network 11-13, and the NIC unit 207, 217, or 227 is connected to the transit network 10. Each of the NIC units 206, 216, and 226 connected respectively to the local networks 11-13 holds a MAC address as an identifier used in the local network 11-13, transmits Ethernet frames received from the destination processing unit 201, 211, or 221 to the local network 11-13, and transmits Ethernet frames received from the local network 11-13 to the filter unit 203, 213, or 223. Each of the NIC units 207, 217, and 227 connected to the transit network 10 holds an IP address as an identifier used in the transit network 10 and transfers IP packets between the tunneling part and the transit network 10.

Next, operation of the present exemplary embodiment will be described in detail with reference to FIGS. 3, 4, and 5.

It is now assumed that four terminals including the terminal 30, the terminal 32, the terminal 33, and the terminal 34 form one communication group and that the table units 205, 215, and 225 of the frame processing apparatuses 20, 21, and 22 prestore the following data.

As sets of (a local address, a remote address, a tunneling destination address), the table unit 205 of the frame processing apparatus 20 prestores three sets of addresses including (the MAC address a of the terminal 30, the MAC address c of the terminal 32, the IP address B of the frame processing apparatus 21), (the MAC address a of the terminal 30, the MAC address d of the terminal 33, the IP address B of the frame processing apparatus 21), and (the MAC address a of the terminal 30, the MAC address e of the terminal 34, the IP address C of the frame processing apparatus 22).

As sets of (a local address, a remote address, a tunneling destination address), the table unit 215 of the frame processing apparatus 21 prestores four sets of addresses including (the MAC address c of the terminal 32, the MAC address a of the terminal 30, the IP address A of the frame processing apparatus 20), (the MAC address c of the terminal 32, the MAC address e of the terminal 34, the IP address C of the frame processing apparatus 22), (the MAC address d of the terminal 33, the MAC address a of the terminal 30, the IP address A of the frame processing apparatus 20), and (the MAC address d of the terminal 33, the MAC address e of the terminal 34, the IP address C of the frame processing apparatus 22).

As sets of (a local address, a remote address, a tunneling destination address), the table unit 225 of the frame processing apparatus 22 prestores four sets of addresses including (the MAC address e of the terminal 34, the MAC address a of the terminal 30, the IP address A of the frame processing apparatus 20), (the MAC address e of the terminal 34, the MAC address c of the terminal 32, the IP address B of the frame processing apparatus 21), and (the MAC address e of the terminal 34, the MAC address d of the terminal 33, the IP address B of the frame processing apparatus 21).

Assuming the conditions as configured above, operation of the present exemplary embodiment will be described below.

First, operation in a case where an Ethernet frame whose destination MAC address has been set to be the MAC address c of the terminal 32 is transmitted from the terminal 30 will be described in detail.

Figure 5:
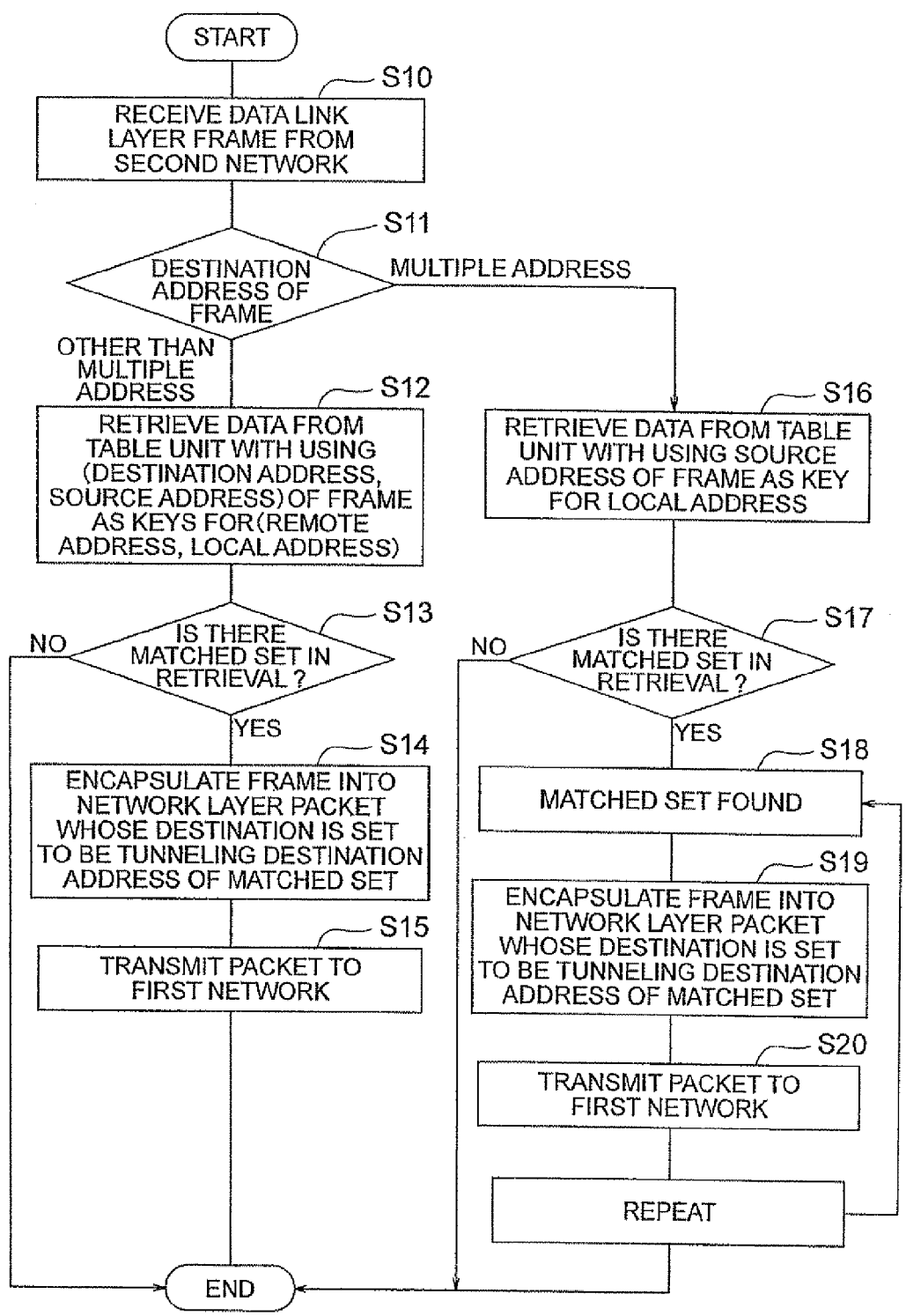
FIG. 5 is a flow chart showing operation of the first exemplary embodiment of the present invention.

When an Ethernet frame whose destination MAC address has been set to be the MAC address c of the terminal 32 is transmitted from the terminal 30, the Ethernet frame is received by the NIC unit 206 of the frame processing apparatus 20 and outputted to the filter unit 203 (Step S10 in FIG. 5).

The filter unit 203 receives an input of the frame. Since the destination MAC address has not been designated as a multiple address (Step S11), the filter unit 203 retrieves data from the table unit 205 with using the MAC address c of the terminal 32, which is the destination MAC address of the frame, and the MAC address a of the terminal 30, which is the source MAC address of the frame, as keys for the local address and the remote address (Step S12). A set of (the MAC address a of the terminal 30, the MAC address c of the terminal 32, the IP address B of the frame processing apparatus 21) is found after the retrieval, Accordingly, the filter unit 203 outputs the frame to the encapsulation unit 204 (Step S13).

The encapsulation unit 204 receives an input of the frame. Since the destination MAC address of the frame has not been designated as a multiple address, the encapsulation unit 204 retrieves data from the table unit 205 with using the MAC address c of the terminal 32, which is the destination MAC address of the frame, and the MAC address a of the terminal 30, which is the source MAC address of the frame, as keys for the local address and the remote address. Then a set of (the MAC address a of the terminal 30, the MAC address c of the terminal 32, the IP address B of the frame processing apparatus 21) is found. Accordingly, the encapsulation unit 204 encapsulates the frame into an IP packet whose the destination IP address is set to be the IP address B of the frame processing apparatus 21 and outputs it to the NIC unit 207 (Step S14).

The NIC unit 207 receives an input of the IP packet and transmits it to the transit network 10 (Step S15).

The transit network 10 transmits the IP packet to the frame processing apparatus 21, which is designated as the destination IP address B.

Figure 4:
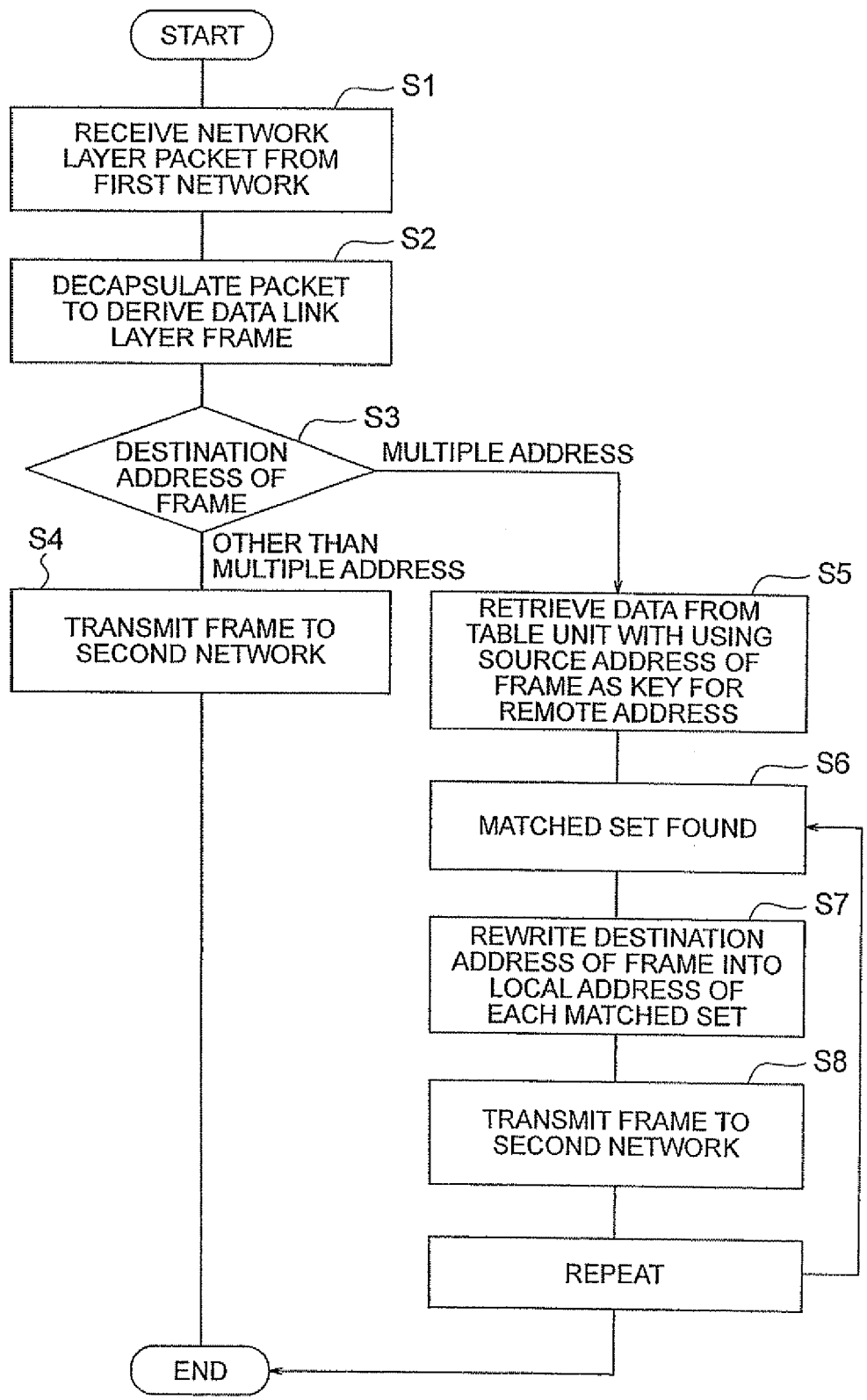
FIG. 4 is a flow chart showing operation of the first exemplary embodiment of the present invention.

The frame processing apparatus 21 receives the IP packet with the NIC unit 217 and outputs it to the decapsulation unit 212 (Step S1 in FIG. 4).

The decapsulation unit 212 decapsulates the IP packet and outputs the restored frame to the destination processing unit 211 (Step S2).

The destination processing unit 211 receives an input of the frame and outputs the frame to the NIC unit 216 because its destination MAC address c has not been designated as a multiple address (Step S3).

The NIC unit 216 transmits the inputted frame to the local network 12 (Step S4).

The local network 12 transmits the frame to the terminal 32, which corresponds to the destination MAC address c of the received frame.

Thus, when an Ethernet frame whose destination MAC address has been set to be the MAC address c of the terminal 32 is transmitted from the terminal 30, the terminal 32 receives the frame Conversely, when an Ethernet frame whose destination MAC address has been set to be the MAC address a of the terminal 30 is transmitted from the terminal 32, a similar operation is performed, so that the terminal 30 receives the frame.

Next, operation in a case where an Ethernet frame whose destination MAC address has been designated as a multiple address (a broadcast address or a multicast address) is transmitted from the terminal 30 will be described in detail.

When an Ethernet frame whose destination MAC address has been designated as a multiple address is transmitted from the terminal 30, the Ethernet frame is received by the NIC unit 206 of the frame processing apparatus 20 and outputted to the filter unit 203 (Step S10 in FIG. 5).

The filter unit 203 receives an input of the frame. Since the destination MAC address has been designated as multiple address (Step S11), the filter unit 203 retrieves data from the table unit 205 with using the MAC address a of the terminal 30, which is the source MAC address of the frame, as a key for the local address (Step S16). Then three sets of (the MAC address a of the terminal 30, the MAC address c of the terminal 32, the IP address B of the frame processing apparatus 21), (the MAC address a of the terminal 30, the MAC address d of the terminal 33, the IP address B of the frame processing apparatus 21), and (the MAC address a of the terminal 30, the MAC address e of the terminal 34, the IP address C of the frame processing apparatus 22) are found. Accordingly, the filter unit 203 outputs the frame to the encapsulation unit 204 (Step S17).

The encapsulation unit 204 receives an input of the frame. Since the destination MAC address of the frame has been designated as a multiple address, the encapsulation unit 204 retrieves data from the table unit 205 with using the MAC address a of the terminal 30, which is the source MAC address of the frame, as a key for the local address. Then three sets of (the MAC address a of the terminal 30, the MAC address c of the terminal 32, the IP address B of the frame processing apparatus 21), (the MAC address a of the terminal 30, the MAC address d of the terminal 33, the IP address B of the frame processing apparatus 21), and (the MAC address a of the terminal 30, the MAC address e of the terminal 34, the IP address C of the frame processing apparatus 22) are found. There are two different tunneling destination addresses including the IP address B of the frame processing apparatus 21 and the IP address C of the frame processing apparatus 22 (Step S18). Accordingly, the encapsulation unit 204 encapsulates the frame into two packets including an IP packet whose destination IP address is set to be the IP address B of the frame processing apparatus 21 and an IP packet whose destination IP address is set to be the IP address C of the frame processing apparatus 22. Then the encapsulation unit 204 outputs those packets to the NIC unit 207 (Step S19).

The NIC unit 207 receives an input of the two IP packets and transmits the respective packets to the transit network 10 (Step S20).

The transit network 10 transmits to the frame processing apparatus 21 the IP packet addressed to the destination IP address B and transmits to the frame processing apparatus 22 the IP packet addressed to the destination IP address C.

The frame processing apparatus 21 receives the IP packet with the NIC unit 217 and outputs it to the decapsulation unit 212 (Step S1 in FIG. 4).

The decapsulation unit 212 decapsulates the IP packet and outputs the restored frame to the destination processing unit 211 (Step S2).

The destination processing unit 211 receives an input of the frame. Since the destination MAC address has been designated as a multiple address (Step S3), the destination processing unit 211 retrieves data from the table unit 215 with using the MAC address a of the terminal 30, which is the source MAC address of the frame, as a key for the remote address (Step S5). Two sets of (the MAC address c of the terminal 32, the MAC address a of the terminal 30, the IP address A of the frame processing apparatus 20) and (the MAC address d of the terminal 33, the MAC address a of the terminal 30, the IP address A of the frame processing apparatus 20) are found (Step S6). Accordingly, the destination processing unit 211 generates two frames including a frame in which the destination MAC address of the frame is replaced with the MAC address c of the terminal 32 and a frame in which the destination MAC address of the frame is replaced with the MAC address d of the terminal 33 (Step S7) and outputs the respective frames to the NIC unit 216. The NIC unit 216 transmits the respective inputted frames to the local network 12 (Step S8).

The local network 12 transmits the received frames to the terminal 32 and the terminal 33, respectively. Each of the terminal 32 and the terminal 33 receives the frame.

On the other hand, the frame processing apparatus 22 receives the IP packet with the NIC unit 227 and outputs it to the decapsulation unit 222 (Step S1 in FIG. 4).

The decapsulation unit 222 decapsulates the IP packet and outputs the restored frame to the destination processing unit 221 (Step S2).

The destination processing unit 221 receives an input of the frame. Since the destination MAC address has been designated as a multiple address (Step S3), the destination processing unit 221 retrieves data from the table unit 225 with using the MAC address a of the terminal 30, which is the source MAC address of the frame, as a key for the remote address (Step S5). Since a set of (the MAC address e of the terminal 34, the MAC address a of the terminal 30, the IP address A of the frame processing apparatus 20) is found (Step S6), the destination processing unit 221 generates a frame in which the destination MAC address of the frame is replaced with the MAC address e of the terminal 34 (Step S7) and outputs the generated frame to the NIC unit 226. The NIC unit 226 transmits the inputted frame to the local network 13 (Step S8).

The local network 13 transmits the frame to the terminal 34, which corresponds to the destination MAC address e of the received frame. The terminal 34 receives the frame.

As described above, a multiple-addressed frame issued from the terminal 30 is respectively received by the terminals that correspond to the remote addresses c, d, and e stored in the table unit 205, i.e., the terminal 32, the terminal 33, and the terminal 34. Although the terminal 31 also receives this multiple-addressed frame, no particular problem arises because the terminal 31 is connected to the same local network 11 as the terminal 30.

Next, operation in a case where an Ethernet frame whose destination MAC address has been designated as a multiple address is transmitted from the terminal 31 will be described in detail.

When an Ethernet frame whose destination MAC has been designated as a multiple address is transmitted from the terminal 31, the Ethernet frame is received by the NIC unit 206 of the frame processing apparatus 20 (Step S10 in FIG. 5) and outputted to the filter unit 203.

The filter unit 203 receives an input of the frame. Since the destination MAC address has been designated as a multiple address (Step S11), the filter unit 203 retrieves data from the table unit 205 with using the MAC address b of the terminal 31, which is the source MAC address of the frame, as a key for the local address (Step S16). In this case, no sets are found to be matched (Step S17). Accordingly, the filter unit 203 discards the frame.

Thus, according to the present exemplary embodiment, the terminals 30-35, which are separated by the transit network 10 through which data link layer frames cannot directly be received or transmitted, and which cannot utilize VLAN, tunneling means, or the like, can directly receive data link layer frames from and transmit data link layer frames to each other. Furthermore, according to the present invention, other unauthorized terminals are prevented from processing data link layer frames transmitted through the transit network 10.

Next, a second exemplary embodiment of the present invention will be described in detail with reference to the drawings.

Figure 6:
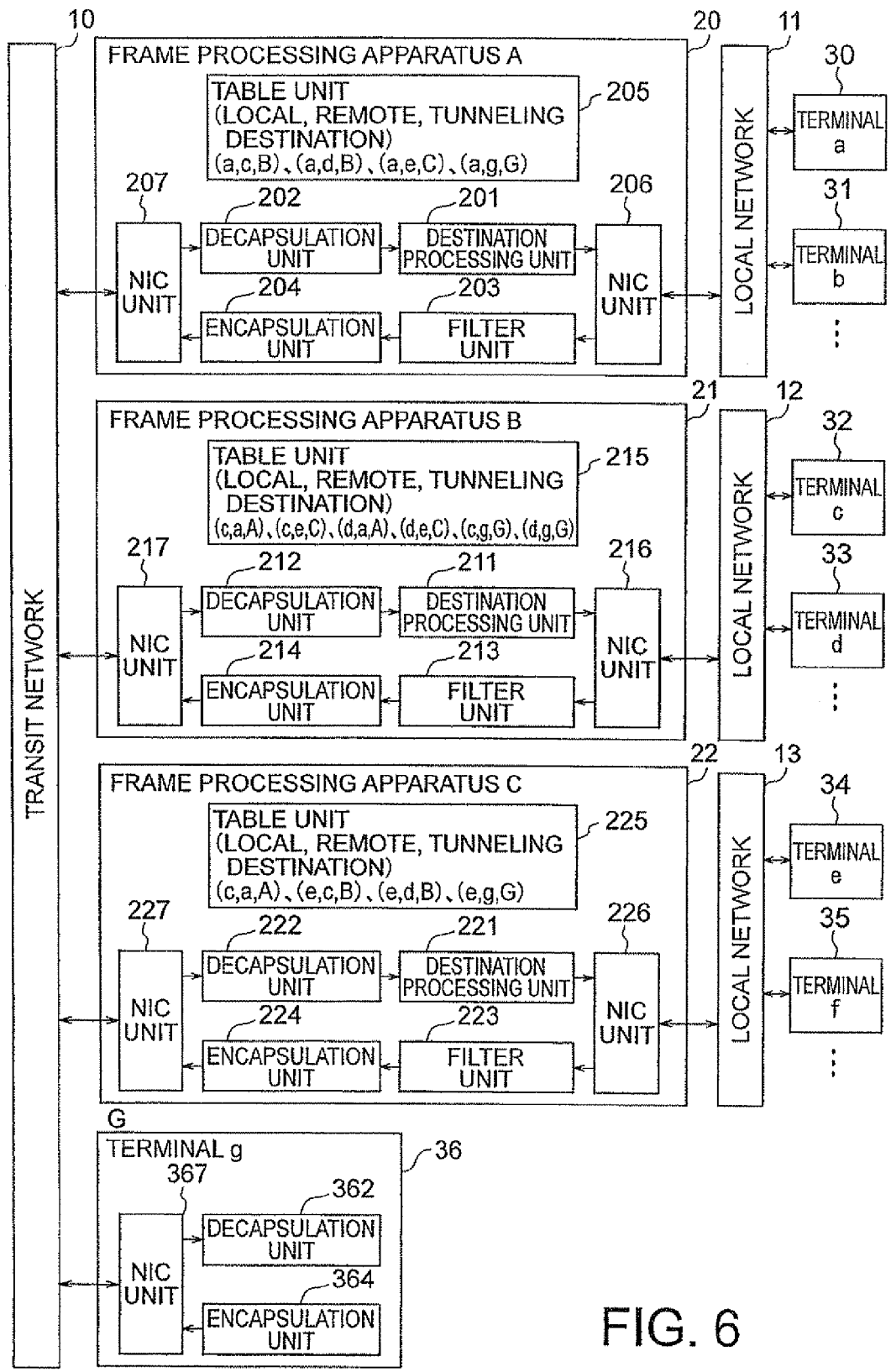
FIG. 6 is a block diagram showing an entire network configuration of a second exemplary embodiment of the present invention.

Referring to FIG. 6, the present exemplary embodiment is the same as the first exemplary embodiment of the present invention except that at least one terminal 36 is connected to the transit network 10 operable to communicate with using IP packets, such as the Internet or a regional IP network.

The terminal 36 has a NIC unit 367 connectable to the transit network 10, a decapsulation unit 362 operable to decapsulate an encapsulated IP packet inputted from the NIC unit 367 to derive an Ethernet frame, and an encapsulation unit 364 operable to encapsulate an Ethernet frame into an IP packet and output the IP packet to the NIC unit 367. The NIC unit 367 holds an IP address G, which is an identifier used in the transit network 10, and a MAC address g. With such configuration, the frame processing apparatuses 20-22 recognize the terminal 36 as a device similar to the frame processing apparatuses.

Furthermore, as sets of (a local address, a remote address, a tunneling destination address), the table unit 205 of the frame processing apparatus 20 in the present exemplary embodiment stores four sets of addresses including (the MAC address a of the terminal 30, the MAC address c of the terminal 32, the IP address B of the frame processing apparatus 21), (the MAC address a of the terminal 30, the MAC address d of the terminal 33, the IP address B of the frame processing apparatus 21), (the MAC address a of the terminal 30, the MAC address e of the terminal 34, the IP address C of the frame processing apparatus 22), and (the MAC address a of the terminal 30, the MAC address g of the terminal 36, the IP address G of the terminal 36).

As sets of (a local address, a remote address, a tunneling destination address), the table unit 215 of the frame processing apparatus 21 prestores six sets of addresses including (the MAC address c of the terminal 32, the MAC address a of the terminal 30, the IP address A of the frame processing apparatus 20), (the MAC address c of the terminal 32, the MAC address e of the terminal 34, the IP address C of the frame processing apparatus 22), (the MAC address d of the terminal 33, the MAC address a of the terminal 30, the IP address A of the frame processing apparatus 20), (the MAC address d of the terminal 33, the MAC address e of the terminal 34, the IP address C of the frame processing apparatus 22), (the MAC address c of the terminal 32, the MAC address g of the terminal 36, the IP address G of the terminal 36), and (the MAC address d of the terminal 33, the MAC address g of the terminal 36, the IP address G of the terminal 36).

As sets of (a local address, a remote address, a tunneling destination address), the table unit 225 of the frame processing apparatus 22 prestores four sets of addresses including (the MAC address e of the terminal 34, the MAC address a of the terminal 30, the IP address A of the frame processing apparatus 20), (the MAC address e of the terminal 34, the MAC address c of the terminal 32, the IP address B of the frame processing apparatus 21), (the MAC address e of the terminal 34, the MAC address d of the terminal 33, the IP address B of the frame processing apparatus 21), and (the MAC address e of the terminal 34, the MAC address g of the terminal 36, the IP address G of the terminal 36).

With this configuration, through processes similar to the aforementioned processes in the first exemplary embodiment of the present invention, the terminal 36 can communicate directly with the terminals 30, 32, 33, and 34 in the same group in the respective local networks 11-13 with use of Ethernet frames.

This configuration enables the terminal 36, such as a PC carried away from home, to have direct remote access to a specified terminal in the home.

Although the exemplary embodiments of the present invention have been described, the present invention is not limited to the above examples. Other various additions or modifications can be made within the present invention. Furthermore, as a matter of course, the functions of the frame processing apparatus according to the present invention can be implemented by hardware. The frame processing apparatus according to the present invention may also implemented by a computer and a program. The program is provided in a state such that it is stored in a computer-readable storage medium, such as a magnetic disk or a semiconductor memory.

The program is read by the computer, for example, when the computer is booted up. The program controls operation of the computer so that the computer functions as the frame processing apparatus in the aforementioned exemplary embodiments and performs processes as exemplified in FIGS. 4 and 5.

The invention claimed is:

1. A frame processing method comprising:
receiving an encapsulated network layer packet from a first network, the encapsulated network layer packet comprising a packet which encapsulates a first data link layer frame with a tunneling network layer header;
decapsulating the received encapsulated network layer packet to obtain the first data link layer frame;
converting the first data link layer frame obtained from the first network if a destination address of the first data link layer frame has a destination address designated as a multiple address, into one or more data link layer frames in which the destination address is replaced with each of one or more unicast addresses that are associated in advance with a source address of the first data link layer frame; and
outputting the converted one or more data link layer frames to a second network,
if a set of a destination address and a source address of a second data link layer frame received from the second network is matched with a predetermined set of a destination address and a source address, or if the destination address of the second data link layer frame has been designated as a multiple address and the source address of the second data link layer frame is matched with one or more predetermined source addresses, then validating the second data link layer frame, otherwise discarding the second data link layer frame;
if the destination address of the valid second data link layer frame has been designated as a multiple address, encapsulating the second data link layer frame into at least one network layer packet whose destination address is set to be at least one tunneling destination address predetermined for the source address of the second data link layer frame; or
if the destination address of the valid second data link layer frame has not been designated as a multiple address, encapsulating the second data link layer frame into a network layer packet whose destination address is set to be a tunneling destination address predetermined for the set of the destination address and the source address of the second data link layer frame; and
transmitting each packet to the first network.

2. The frame processing method as recited in claim 1, comprising:
directly outputting the first data link layer frame if the destination address of the first data link layer frame has been designated as other than a multiple address to the second network.

3. The frame processing method as recited in claim 1, wherein in the converting the first data link layer frame obtained from the first network if a destination address of the first data link layer frame has a destination address designated as a multiple address, into one or more data link layer frames in which the destination address is replaced with each of one or more unicast addresses that are associated in advance with a source address of the first data link layer frame, a network layer address contained in the first data link layer frame remains unchanged.

4. A frame processing method in a frame processing apparatus connected to a first network and a second network and having a table unit holding at least one set of a local address which is a data link layer address of a terminal connected to the second network, a remote address which is a data link layer address of a terminal connected to a local network under the control of a tunneling destination apparatus, and a tunneling destination address which is a network layer address assigned to the tunneling destination apparatus on the first network, comprising:

a) a step of receiving an encapsulated network layer packet from the first network, the encapsulated network layer packet comprising a packet which encapsulates a first data link layer frame with a tunneling network layer header, and
decapsulating the received network layer packet to obtain the first data link layer frame;

b) a step of, if a destination address of the first data link layer frame obtained in step a) has been designated as a multiple address, retrieving data from the table unit with using a source address of the first data link layer frame as a key for the remote address,
generating one or more frames in which the destination address of the first data link layer frame is replaced with each of local addresses of one or more matched sets, and transmitting the generated one or more frames to the second network, or
if the destination address of the first data link layer frame has been designated as other than a multiple address, transmitting the first data link layer frame directly to the second network;

c) a step of receiving a second data link layer frame from the second network,
retrieving data from the table unit with using a destination address and a source address of the received second data link layer frame as keys for the remote address and the local address,
if there is any matched set, or if the destination address of the received second data link layer frame has been designated as a multiple address and there is any matched set when retrieving data from the table unit with using the source address of the received second data link layer frame as a key for the local address,
then validating the second data link layer frame, otherwise discarding the second data link layer frame; and d) a step of, if the destination address of the second data link layer frame validated in step c) has been designated as a multiple address, retrieving data from the table unit with using the source address of the second data link layer frame as a key for the local address, and
encapsulating the second data link layer frame into at least one network layer packet whose destination address is set to be each of different tunneling destination addresses of one or more matched sets, or
if the destination address of the second data link layer frame validated in step c) has not been designated as a multiple address, retrieving data from the table unit with using the destination address and the source address of the second data link layer frame as keys for the remote address and the local address, and
encapsulating the second data link layer frame into a network layer packet whose destination address is set to be a tunneling destination address of the matched set, and transmitting each packet to the first network.

5. The frame processing method as recited in claim 4, wherein:
each of the first and second data link layer frames is an Ethernet frame,
the network layer packet is an IP packet,
the multiple address is a broadcast address or a multicast address of an Ethernet,
each of the local address and the remote address in the table unit is a MAC address,
the tunneling destination address in the table unit is an IP address,
the first network is an intranet or the Internet capable of transferring an IP packet, and
the second network is a wired or wireless LAN capable of transferring an Ethernet frame.

6. The frame processing method as recited in claim 4, wherein the encapsulation method and the decapsulation method used in step d) and step a) are either one of EtherIP, Ethernet over HTTPS, Ethernet over IPsec, L2TP, Ethernet over UDP, and Ethernet over TCP.

7. The frame processing method as recited in claim 4, wherein in the generating one or more frames in which the destination address of the first data link layer frame is replaced with each of local addresses of one or more matched sets, a network layer address contained in the first data link layer frame remains unchanged.

8. A frame processing apparatus comprising:
a decapsulation unit operable to receive an encapsulated network layer packet from a first network, the encapsulated network layer packet comprising a packet which encapsulates a first data link layer frame with a tunneling network layer header and decapsulate the received encapsulated network layer packet to obtain the first data link layer frame;
a destination processing unit operable to convert the first data link layer frame obtained from the first network if a destination address of the first data link layer frame has a destination address designated as a multiple address, into one or more data link layer frames in which the destination address of the first data link layer frame is replaced with each of one or more unicast addresses that are associated in advance with a source address of the first data link layer frame and to output the converted one or more data link layer frames to a second network;
a filter unit operable to, if a set of a destination address and a source address of a second data link layer frame received from the second network is matched with a predetermined set of a destination address and a source address, or if the destination address of the second data link layer frame has been designated as a multiple address and the source address of the second data link layer frame is matched with one or more predetermined source addresses, then validate the second data link layer frame, otherwise discard the second data link layer frame; and
an encapsulation unit operable to, if the destination address of the valid second data link layer frame has been designated as a multiple address, encapsulate the second data link layer frame into at least one network layer packet whose destination address is set to be at least one tunneling destination address predetermined for the source address of the second data link layer frame, or, if the destination address of the valid second data link layer frame has not been designated as a multiple address, encapsulate the second data link layer frame into a network layer packet whose destination address is set to be a tunneling destination address predetermined for the set of the destination address and the source address of the second data link layer frame, and transmit each packet to the first network.

9. The frame processing apparatus as recited in claim 8, wherein the destination processing unit directly outputs the first data link layer frame if the destination address of the first data link layer frame has been designated as other than a multiple address, to the second network.

10. The frame processing apparatus as recited in claim 8, wherein when the destination processing unit converts the first data link layer frame into one or more data link layer frames, a network layer address contained in the first data link layer frame remains unchanged.

11. A frame processing apparatus connected to a first network and a second network, comprising:
a table unit holding at least one set of a local address which is a data link layer address of a terminal connected to the second network, a remote address which is a data link layer address of a terminal connected to a local network under the control of a tunneling destination apparatus, and a tunneling destination address which is a network layer address assigned to the tunneling destination apparatus on the first network;
a decapsulation unit operable to receive an encapsulated network layer packet from the first network, the encapsulated network layer packet comprising a packet which encapsulates a first data link layer frame with a tunneling network layer header and decapsulate the received encapsulated network layer packet to obtain the first data link layer frame;
a destination processing unit operable to, if a destination address of the first data link layer frame obtained in the decapsulation unit has been designated as a multiple address, retrieve data from the table unit with using a source address of the first data link layer frame as a key for the remote address, generate one or more frames in which the destination address of the first data link layer frame is replaced with each of local addresses of one or more matched sets, and transmit the generated one or more frames to the second network, or, if the destination address of the first data link layer frame has been designated as other than a multiple address, transmit the first data link layer frame directly to the second network;
a filter unit operable to receive a second data link layer frame from the second network, retrieve data from the table unit with using a destination address and a source address of the received second data link layer frame as keys for the remote address and the local address, if there is any matched set, or if the destination address of the received second data link layer frame has been designated as a multiple address and there is any matched set when retrieving data from the table unit with using the source address of the received second data link layer frame as a key for the local address, then validate the second data link layer frame, otherwise discard the second data link layer frame; and
an encapsulation unit operable to, if the destination address of the second data link layer frame validated in the filter unit has been designated as a multiple address, retrieve data from the table unit with using the source address of the second data link layer frame as a key for the local address and encapsulate the second data link layer frame into at least one network layer packet whose destination address is set to be each of different tunneling destination addresses of one or more matched sets, or, if the destination address of the second data link layer frame validated in the filter unit has not been designated as a multiple address, retrieve data from the table unit with using the destination address and the source address of the second data link layer frame as keys for the remote address and the local address and encapsulate the second data link layer frame into a network layer packet whose destination address is set to be a tunneling destination address of the matched set, and transmit each packet to the first network.

12. The frame processing apparatus as recited in claim 11, wherein:
each of the first and second data link layer frames is an Ethernet frame,
the network layer packet is an IP packet,
the multiple address is a broadcast address or a multicast address of an Ethernet,
each of the local address and the remote address in the table unit is a MAC address,
the tunneling destination address in the table unit is an IP address,
the first network is an intranet or the Internet capable of transferring an IP packet, and
the second network is a wired or wireless LAN capable of transferring an Ethernet frame.

13. The frame processing apparatus as recited in claim 11, wherein the encapsulation method and the decapsulation method used in the encapsulation unit and the decapsulation unit are either one of EtherIP, Ethernet over HTTPS, Ethernet over IPsec, L2TP, Ethernet over UDP, and Ethernet over TCP.

14. The frame processing apparatus as recited in claim 11, wherein when the destination processing unit generates one or more data link layer frames in which the destination address of the first data link layer frame is replaced with each of local addresses of one or more matched sets, a network layer address contained in the first data link layer frame remains unchanged.

15. A computer program embodied on a computer readable storage device for providing a computer with functions of:
decapsulation means for receiving an encapsulated network layer packet from a first network, the encapsulated network layer packet comprising a packet which encapsulates a first data link layer frame with a tunneling network layer header and decapsulating the received encapsulated network layer packet to obtain the first data link layer frame;
destination processing means for converting the first data link layer frame obtained from first network if a destination address of the first data link layer frame has a destination address designated as a multiple address, into one or more data link layer frames in which the destination address is replaced with each of one or more unicast addresses that are associated in advance with a source address of the first data link layer frame; and outputting the converted one or more data link layer frames to a second network;
filter means for, if a set of a destination address and a source address of a second data link layer frame received from the second network is matched with a predetermined set of a destination address and a source address, or if the destination address of the second data link layer frame has been designated as a multiple address and the source address of the data link layer frame is matched with one or more predetermined source addresses, then validating the second data link layer frame, otherwise discarding the second data link layer frame; and
encapsulation means for, if the destination address of the valid second data link layer frame has been designated as a multiple address, encapsulating the second data link layer frame into at least one network layer packet whose destination address is set to be at least one tunneling destination address predetermined for the source address of the second data link layer frame, or, if the destination address of the valid second data link layer frame has not been designated as a multiple address, encapsulating the second data link layer frame into a network layer packet whose destination address is set to be a tunneling destination address predetermined for the set of the destination address and the source address of the second data link layer frame, and transmitting each packet to the first network.

16. The computer program as recited in claim 15, wherein the destination processing means directly outputs the first data link layer frame if the destination address of the first data link layer frame has been designated as other than a multiple address to the second network.

17. The computer program as recited in claim 15, wherein when the destination processing means converts the first data link layer frame into one or more data link layer frames, a network layer address contained in the first data link layer frame remains unchanged.

18. A computer program embodied on a computer readable storage device for providing a computer being connected to a first network and a second network and said computer having a storage unit operable to store a table holding at least one set of a local address which is a data link layer address of a terminal connected to the second network, a remote address which is a data link layer address of a terminal connected to a local network under the control of a tunneling destination apparatus, and a tunneling destination address which is a network layer address assigned to the tunneling destination apparatus on the first network, with functions of:

decapsulation means for receiving an encapsulated network layer packet from the first network, the encapsulated network layer packet comprising a packet which encapsulates a first data link layer frame with a tunneling network layer header and decapsulating the received encapsulated network layer packet to obtain the first data link layer frame;

destination processing means for, if a destination address of the first data link layer frame obtained in the decapsulation means has been designated as a multiple address, retrieving data from the table with using a source address of the first data link layer frame as a key for the remote address, generating one or more frames in which the destination address of the first data link layer frame is replaced with each of local addresses of one or more matched sets, and transmitting the generated one or more frames to the second network, or, if the destination address of the first data link layer frame has been designated as other than a multiple address, transmitting the first data link layer frame directly to the second network;

filter means for receiving a second data link layer frame from the second network, retrieving data from the table with using a destination address and a source address of the received second data link layer frame as keys for the remote address and the local address, and, if there is any matched set, or if the destination address of the received second data link layer frame has been designated as a multiple address and there is any matched set when retrieving data from the table with using the source address of the received second data link layer frame as a key for the local address, then validating the second data link layer frame, otherwise discarding the second data link layer frame; and encapsulation means for, if the destination address of the second data link layer frame validated in the filter means has been designated as a multiple address, retrieving data from the table with using the source address of the second data link layer frame as a key for the local address and encapsulating the second data link layer frame into at least one network layer packet whose destination address is set to be each of different tunneling destination addresses of one or more matched sets, or, if the destination address of the second data link layer frame validated in the filter means has not been designated as a multiple address, retrieving data from the table with using the destination address and the source address of the second data link layer frame as keys for the remote address and the local address and encapsulating the second data link layer frame into a network layer packet whose destination address is set to be a tunneling destination address of the matched set, and transmitting each packet to the first network.

19. The computer program as recited in claim 18, wherein:
each of the first and second data link layer frames is an Ethernet frame,
the network layer packet is an IP packet,
the multiple address is a broadcast address or a multicast address of an Ethernet,
each of the local address and the remote address in the table unit is a MAC address,
the tunneling destination address in the table unit is an IP address,
the first network is an intranet or the Internet capable of transferring an IP packet, and
the second network is a wired or wireless LAN capable of transferring an Ethernet frame.

20. The computer program as recited in claim 18, wherein the encapsulation method and the decapsulation method used in the encapsulation means and the decapsulation means are either one of EtherIP, Ethernet over HTTPS, Ethernet over IPsec, L2TP, Ethernet over UDP, and Ethernet over TCP.

21. The computer program as recited in claim 18, wherein when the destination processing means generates one or more data link layer frames in which the destination address of the first data link layer frame is replaced with each of local addresses of one or more matches sets, a network layer address contained in the first data link layer frame remains unchanged.

* * * * *